(No Model.) 2 Sheets—Sheet 1.
G. A. CASSAGNES.
SYSTEM OF SYNCHRONISM FOR TELEGRAPHY.
No. 465,832. Patented Dec. 29, 1891.
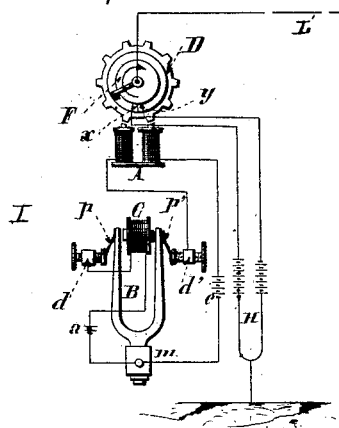
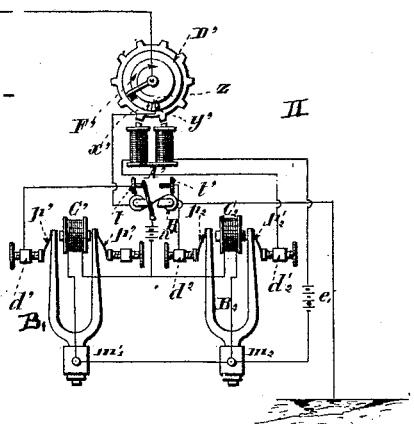
FIG-1-
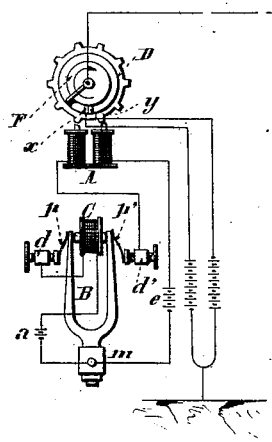
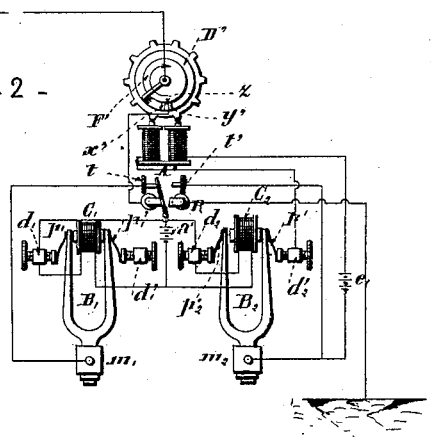
FIG-2-
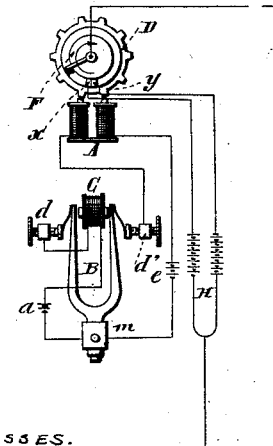
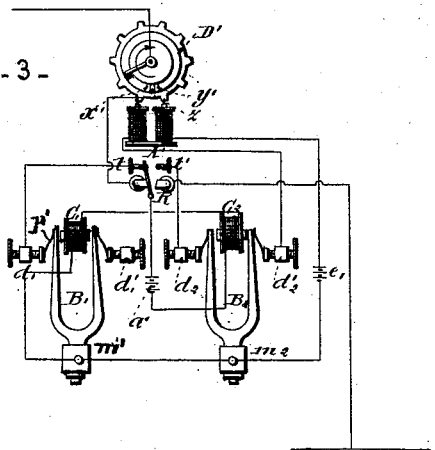
FIG-3-
WITNESSES.
George Laurent
Alexandre Hulin
INVENTOR
Gilbert Alfred Cassagnes
By Briesen & Knauth
his Attorneys
THE NORRIS PETERS CO., PHOTO-LITHO., WASHINGTON, D. C.

(No Model.) 2 Sheets—Sheet 2.
G. A. CASSAGNES.
SYSTEM OF SYNCHRONISM FOR TELEGRAPHY.
No. 465,832. Patented Dec. 29, 1891.
FIG-4-
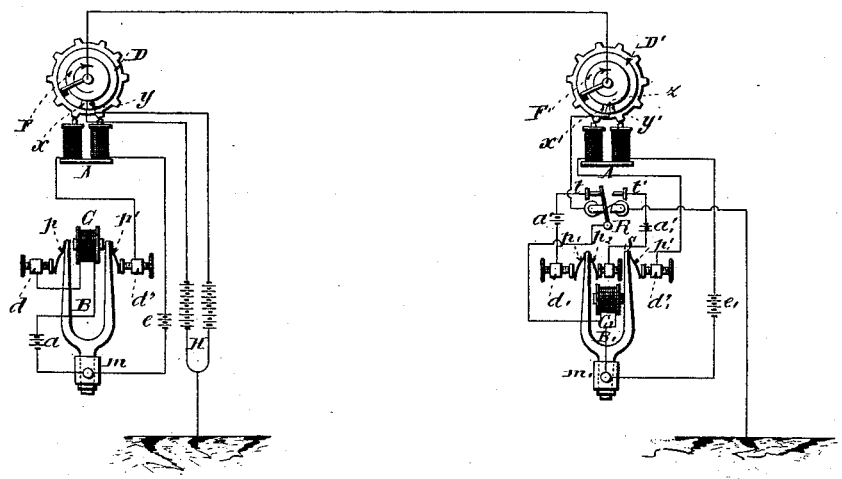
FIG-5-
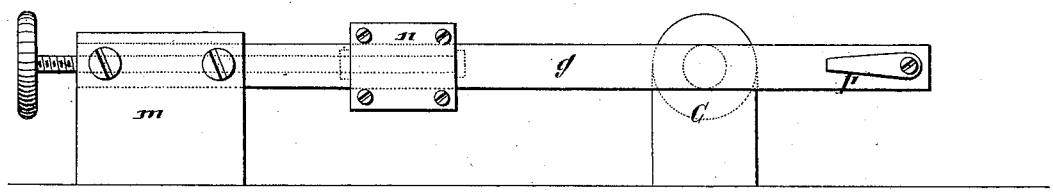
FIG-6- FIG-7-
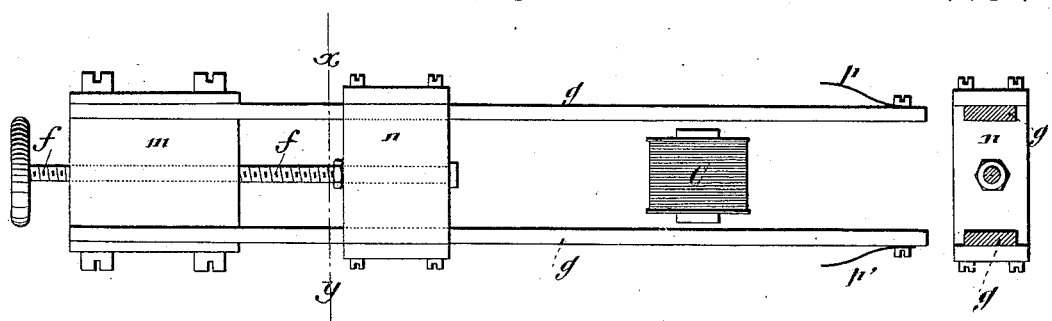

UNITED STATES PATENT OFFICE.

GILBERT ALFRED CASSAGNES, OF PARIS, FRANCE.

SYSTEM OF SYNCHRONISM FOR TELEGRAPHY.

SPECIFICATION forming part of Letters Patent No. 465,832, dated December 29, 1891.

Application filed June 26, 1891. Serial No 397,565. (No model.) Patented in France November 27, 1890, No. 209,839.

*To all whom it may concern:*

Be it known that I, GILBERT ALFRED CASSAGNES, civil engineer, of Paris, in the Republic of France, have invented a new or Improved System of Synchronism for Telegraphy, (for which I have obtained Letters Patent of France for fifteen years, No. 209,839, dated November 27, 1890;) and I do hereby declare that the following is a full and exact description thereof, reference being made to the accompanying drawings.

In the patents issued to me on August 30, 1887, No. 368,931, and on December 27, 1887, No. 375,339, under the title of "System of Synchronism for Telegraphy," I have described certain methods for establishing and maintaining a synchronism between two distant stations for the uses of multiplex telegraphy. I have since introduced certain new and useful improvements, which form the object of this specification.

The object of the processes described and illustrated in this specification is to establish and maintain such a synchronism between a trailer rotating on a contact-distributer at one station and another trailer rotating on a contact distributer at a second station distant from the first and connected with it by a single line-wire, so that that single line-wire can be employed for the uses of multiplex telegraphy. This result can be obtained by one or other of the methods of connection hereinafter described. These methods are only obvious modifications one of the other, as the apparatus employed are of the same nature in the different cases and as the electric connections alone undergo certain changes. As it will be seen further on, the apparatus made use of are: *a*, electro-tuning-forks; *b*, electric motors; *c*, transmitting and receiving distributers, and *d* polarized relays.

It should be stated here that the electric motors employed can be of any suitable type. It is only sufficient that they should rotate at a uniform fixed speed for each particular type under the influence of the vibratory currents which pass through them through their connection with the electro-tuning-forks. In the cases illustrated in the accompanying drawings these motors are diagrammatically represented as phonic wheels of Poul la Cour; but the construction of the motors, for which no claim is made, can vary within such limits as may be deemed convenient, provided they fulfill the above-mentioned requirements of uniformity of speed.

In the drawings, Figure 1 is a diagrammatic view of one mode of accomplishing my invention. Figs. 2, 3, and 4 are diagrammatic views of modifications thereof. Fig. 5 is a side elevation of an improved electro-tuning fork. Fig. 6 is a plan view of the same, and Fig. 7 a section on the line $x\ y$, Fig. 6.

Figure 1 illustrates the general arrangement of the apparatus according to one method of connection and shows the complete diagram of the necessary connections in order to cause a trailer moving on a current-distributer at a station I to rotate synchronously with a trailer moving on a similar current-distributer at a second station II. The two stations I and II are connected by a single line-wire L. At station I an electro-tuning fork B is kept in vibration by the current of a local battery $a$. The poles of the battery $a$ are respectively connected with the mass $m$ of the tuning-fork B and with one of the extremities of the electro-magnet C. The other extremity of the coil of C is connected with a contact-screw $d$, opposite which is a little platinum spring $p$, fixed on one of the tines of the tuning-fork. If the screw $d$ is gradually worked so as to touch the spring $p$ at the moment when the contact is made, the circuit of the battery $a$ will be closed through C and the tines of the tuning-fork will be attracted on account of the magnetization of the electro-magnet. This attraction will cause a break between $d$ and $p$. The magnetization of C will instantly cease and the tines of B will go back to their original position, which will again produce contact between $d$ and $p$. The repetition of these actions will therefore keep B in a state of continuous vibration. The other tine of B is also provided with a small platinum spring $p'$, placed opposite a contact-screw $d'$. The vibrations of the tuning-fork will therefore produce successive makes and breaks in the contact between $p'$ and $d'$, and these actions are utilized to close and open successively the circuit of another local battery $e$ through the electro-magnet A of the phonic wheel of station I, or through the armature of any suitable electric motor. One of the poles of $e$ is attached to the mass $m$ of the tuning-fork and the other to one of the extremities of the coil of the electro-magnet A. The other extremity of this coil is connected with the contact-spring $d'$. As it is well-known in these conditions the phonic wheel placed in front of the cores of A will, once set into motion, assume a uniform speed determined by the rate of vibration of the tuning-fork and the number of teeth on the wheel. The spindle of the wheel carries a trailing arm F, rotating on a fixed current-distributer D. This distributer can be divided into as many contact-segments as may be deemed necessary for the transmission of signals; but two of the segments $x$ and $y$ are used for the correction and maintenance of synchronism between the two stations. For this object one of them—$x$, for instance—is connected with the positive pole and $y$ with the negative pole of a line battery H, the middle of which is put to earth. The line-wire L is in electrical connection with the trailer F at station I and with the trailer F' at station II. This trailer F' is carried by the spindle of the phonic wheel of the receiving-station and rotates on a current-distributer D', similar to the distributer D of the transmitting-station, save in the following respect: The space on D', corresponding to that taken up by the two correcting-segments $x$ and $y$ of D, is divided up into three parts $x'$, $z$, and $y'$, forming three distinct contact-segments. The middle contact $z$ is attached to one of the extremities of the coil of a polarized relay R, the other extremity of which is put to earth.

As is indicated on Fig. 1, station II is provided with two electro-tuning-forks B' and B², the rates of vibration of which are adjusted in such a fashion that the tuning-fork B' vibrates a little more slowly and the tuning-fork B² a little faster than the tuning-fork B of the transmitting-station. For instance, if the tuning-fork B makes $n$ double vibration per second, B' will make $n-a$ and B² $n+\beta$, $a$ and $\beta$ being fixed and predetermined very small quantities compared to $n$. The local battery $a'$ is used to maintain the vibratory motion of B' and B². One of its poles is connected with the coils C' and C² of these two tuning-forks and the other with the tongue of the polarized relay R. According as the tongue of R rests on the abutting screw $t$ or on the abutting screw $t'$ the circuit of the battery $a'$ will be closed through the coil C' or through the coil C² by means of the contact-screw $d'$ and the spring $p'$ or by means of the contact-screw $d^2$ and the spring $p^2$. The other extremities of C' and C² are respectively connected with the mass $m'$ of tuning-fork B' and with the mass $m^2$ of tuning-fork B², those two masses being also connected together. The local battery $e'$ the current of which is periodically interrupted by the vibrations of the tuning-fork B² between the vibrations of the tuning-fork B², between the screw $d'^2$ and the spring $p'^2$, is utilized to produce the successive magnetization and demagnetization of the electro-magnet A', and consequently the uniform motion of the phonic-wheel of station II. This phonic wheel carries the same number of teeth as that of the transmitting-station.

As has already been stated, the speed of the wheel of station I depends upon the rate of vibration of the tuning-fork B and upon the number of teeth of the wheel itself. If N represents the number of teeth, the speed can be expressed by the ratio $\frac{n}{N}$, where $n$ stands for the number of double vibrations per second. Similarly, at station II, according as the wheel is governed by the tuning-fork B' or by the tuning-fork B² its speeds will be respectively $\frac{n-a}{N}$ and $\frac{n+\beta}{N}$. As $a$ and $\beta$ are very small differences, in either case the wheel II will turn a little more slowly or a little faster than the wheel I.

In the case illustrated, Fig. 1, the tongue of the relay R rests on the abutting screw $t$. The battery $a'$ is therefore closed through the electro-magnet C', and contacts $d'$ and $p'$ and will maintain the tuning-fork B, at its normal rate of vibration of $n-a$; but one-half of the current of $a'$ is shunted at the same time through the electro-magnet C² of the tuning-fork B². The tuning-fork B², the normal rate of vibration of which is $n+\beta$, will therefore receive a succession of impulses of a frequency of $n-a$ and will vibrate at this rate, ($a$ and $\beta$ being very small quantities.) The battery $e'$ will therefore send vibratory currents of the same frequency through the electro-magnet A', and the wheel II will turn in this case at the speed $\frac{n-a}{N}$. If, on the other hand, the tongue of the relay rested on the abutting screw $t'$, the tuning-fork B² would vibrate at its normal rate of $n+\beta$ and the speed of wheel II would be $\frac{n-\beta}{N}$.

It is preferable, as is shown on Fig. 1, to connect the battery $e'$ and the electro-magnet A' with the interrupting-organs $p'^2$ and $d'^2$ of the tuning-fork B², which vibrates at the higher rate, because, although it is easy within certain limits for a lower tuning-fork to compel a higher one to vibrate at the same speed as itself, it is comparatively more difficult to produce the opposite effect—namely, to accelerate a lower tuning-fork by means of the currents coming from the vibrations of a higher one. Thus while B' is able to compel B² to vibrate at its own rate of $n-a$ when the tongue of R rests on $t$, B² will not bring much change in the pitch of B' when that tongue is on $t'$, although half of the current of the battery $a'$ is also shunted in this latter case through the electro-magnet C' of B'. This being explained, it is now easy to understand how the synchronism is established and maintained between the two stations I and II.

Suppose that the two wheels are set into motion, the wheel I turns at a fixed speed, and the wheel II at a fixed speed also, but differing slightly in deficiency or in excess, according as the tongue of the relay R rests on $t$ or on $t'$. After a certain number of revolutions the time must necessarily come when the trailer F of station I will pass on one or the other of the two contacts $x$ or $y$ at the exact moment when the trailer F' of station II will be on the contact $z$, which is connected with the relay R. There will then be sent on the line a current, positive or negative, according as F is on $x$ or on $y$. This current will go through $z$ and the coils of the relay R, and thence to earth. If the trailer F is, for instance, on $x$, it is evident that it is slightly in advance on the trailer F', and the wheel II must be caused to turn a little faster. The positive current arising from these positions of the trailers would have for effect to throw the tongue of the relay R on the abutting screw $t'$, and the wheel II would henceforth turn at the speed $\frac{n+\beta}{N}$, slightly faster than the speed $\frac{n}{N}$ of wheel I. This action therefore produces an immediate correcting effect, which tends to bring the two trailers F and F' into the same relative positions on the distributers D and D', and even to set F' in advance of F; but as soon as this last result begins to be felt F will be on $y$ when F' is on $z$. A negative current will therefore be automatically sent on the line and will bring back the tongue of the relay R on the abutting screw $t$, which will cause the wheel II to turn at the speed $\frac{n-\alpha}{N}$, slightly less than the speed $\frac{n}{N}$ of wheel I. These actions are constantly repeated as soon as there is a tendency to a discrepancy in the relative positions of the trailers F and F' on the distributers D and D' of the stations I and II. The trailers will therefore be kept in synchronism and the line-wire L can from that moment be utilized for the transmission of telegraphic signals through the other contact-segments of the distributer D, these signals being received on the corresponding contact-segments of the distributer D'.

Fig. 2 shows another method of connecting the same apparatus in order to arrive at the same end—namely, the synchronism between the stations I and II. The apparatus and connections of station I remain identically the same as those already specified for that station in the first case. There is therefore no necessity for further description. Station II is also provided with the same apparatus in this case as in the preceding one. Their mode of connection is, however, different, as will appear from the following; but these differences have only reference to the circuits of vibration of the tuning-forks B' and B². As in the preceding case, these tuning-forks make, respectively, $n-\alpha$ and $n+\beta$ double vibrations per second. The battery $a'$, which keeps them in vibration, is connected with one of the extremities of the coils C' and C² on one side and with the tongue of the polarized relay R on the other. The abutting screws $t$ and $t'$ of R are respectively connected with the masses $m'$ and $m^2$ of B' and of B². The other extremities of the coils C' and C² communicate, respectively, with the contact-screws $d'$ and $d^2$, these two screws being directly connected together.

In the position illustrated by Fig. 2 the tongue of the relay R rests on the abutting screw $t$. The circuit of battery $a'$ is therefore closed through the electro-magnet C' by means of the contact-pieces $d'$ and $p'$, and the tuning-fork B' will vibrate at its normal rate of $n-\alpha$, but at the same time half of the current of $a'$ shunted through the electro-magnet C² of the tuning-fork B², and this will compel this tuning-fork, the normal rate of which is $n+\beta$, to vibrate at the rate of $n-\alpha$. If the tongue of R rested on the abutting screw $t'$, the tuning-fork B² would vibrate at its own rate of $n+\beta$. The other connections of the motor-battery $e'$ and of the line-circuit being the same as in the first case, it is easy to understand how the synchronism is established and maintained between the two stations I and II without any further explanations on the subject.

Another method of connection is represented by Fig. 3, and also allows of the establishment and maintenance of synchronism between stations I and II by means of some modifications in the way of connecting up the same apparatus. At station I the apparatus and connections remain the same as in the two previous cases. At station II the modification in the connections consists in putting the two coils C' and C² of the tuning-forks B' and B² in series or to cause the same current to flow through them instead of, as in the two previous cases, to divide the current of the vibration-battery $a'$ between these two coils. The tuning-forks B' and B² also vibrate, respectively, at the rates of $n-\alpha$ and $n+\beta$. As is shown on Fig. 3, the vibration-battery $a'$ is attached on the one side with one of the extremities of the coil C², the other extremity of which communicates with one end of the coil C'. The other end of C' is connected with the mass $m'$ of the tuning-fork B', $m'$ being itself directly in communication with the mass $m^2$ of the tuning-fork B². The other pole of $a'$ is attached to the tongue of the relay R, the abutting screws $t$ and $t'$ of which are respectively in connection with the contact-screws $d'$ and $d^2$ of the tuning-forks B' and B².

Fig. 3 represents the tongue of the relay R resting on the abutting screw $t$. The circuit of the battery $a'$ is therefore closed through the tongue of the relay R, the abutting screw $t$, the contact-pieces $d'$ and $p'$, the mass $m'$ of the tuning-fork B', the coil C', the coil C², and back to the other pole of the battery. The interruptions of the current of $a'$ will therefore take place between the contact-pieces $d'$ and $p'$ of the tuning-fork B', and their frequency will be $n-a$. If the tongue of the relay R were on the abutting screw $t'$, it is easy to see that these interruptions would be produced between the contact-pieces $d^2$ and $p^2$ of the tuning-fork B², and that their frequency would consequently be $n+\beta$. In the first position the coils C' and C² will therefore be traversed by the same vibratory current of $n-a$, and the two tuning-forks will vibrate at that rate. In the second position the vibratory current governing the two tuning-forks will be of $n+\beta$. The other connections of the motor-battery $e'$ and of the line-circuit remain the same, as in the cases 1 and 2. It is therefore easy, from what has already been said with regard to those two cases, to understand how the synchronism is established and maintained between the stations I and II.

In the case represented by Fig. 4 the apparatus and connections of station I are again similar to those of the first three cases and need no description. At station II, however, the following modifications are introduced. Instead of using two tuning-forks, as in the above-described examples, a single tuning-fork B' is employed. This tuning-fork B' is tempered and its tines are permanently magnetized north and south, respectively. The left-hand side tine, which has a north polarity, for instance, and which is used to produce the interruptions in the vibration-circuit, is provided with two sets of contact-pieces. One set is external and consists of the contact-screw $d'$ and the spring $p'$. The other set is internal and consists of the contact-screw $d^2$ and the spring $p^2$. The contact-screw $d'$ (external) is connected with the negative pole of a vibration-battery $a'$, the positive pole of which is attached to the abutting screw $t$ of the polarized relay R. The contact-screw $d^2$ (internal) is connected with the positive pole of a second vibration-battery $a''$, equal to the first, and the negative pole of which is attached to the abutting screw $t'$ of the relay R. In the position of the relay R represented on Fig. 4—namely, with the tongue resting on the abutting screw $t$—the vibratory motion of the tuning-fork B' is kept up by the battery $a'$, and this vibratory motion is produced by a series of attractions of the tines of the tuning-fork by the electro-magnet C', which is successively magnetized and demagnetized. As the tines of the tuning-fork themselves are permanently magnetized north and south, it is therefore necessary, in order to produce those attractions, that the current of the battery $a'$ should magnetize the core of the electro-magnet C' in such a way that the pole of this core facing the north tine of the tuning-fork should assume a south polarity and the pole facing the south tine a north polarity. If, on the other hand, the tongue of the relay R rested on the abutting screw $t'$, the vibratory motion of the tuning-fork would be kept up by the vibration-battery $a''$, but in this case no longer by a series of attractions, but by a series of repulsions, for the battery $a''$ sending through the electro-magnet C' current of an opposite direction than those of the battery $a'$, the pole of the core facing the north tine of the tuning-fork would also assume a north polarity and the pole facing the south tine a south polarity. A series of repulsions of the tines, instead of attractions, would therefore ensue. These two modes of maintaining the vibratory motion of the tuning-fork are utilized to produce synchronism in the following manner: The vibrations arising from the successive attractions have a much greater amplitude than those caused by the successive repulsions. On the other side, experiment has shown that the rate of vibration of a tuning-fork varies (in a very limited measure, it is true, but sufficiently for the wants of correction) with the differences of amplitude. Thus a given tuning-fork vibrates at a rather slower rate when its amplitudes are great than when they are small. The tuning-fork B' will therefore vibrate more slowly with the tongue of the relay R on the abutting screw $t$ than with the tongue on $t'$. Consequently the wheel of station II will also turn more slowly when the tongue is on $t$ than when it is on $t'$. If things are so arranged by previous adjustment that the tuning-fork B' (of station II) should vibrate a little slower than the tuning-fork B (of station I) when the tongue of the relay rests on $t$, and a little quicker when it is on $t'$, the system will be in the conditions of differential speeds, in excess or in deficiency, necessary and sufficient for the establishment and the maintenance of the synchronism between the two stations.

In the above-described arrangement the circuits of the motor-battery $e'$ and of the line are identical with those of the three preceding cases, and need no detailed descriptions.

Instead of ordinary electro-tuning-forks, as shown in Figs. 1, 2, 3, and 4, I can also make use of another arrangement hereinafter described. This arrangement consists in two parallel steel bars or tines $g\ g$, fixed at one of their extremities on a block $m$. $p$ and $p'$ represent the contact-springs and C the electro-magnet. There is also provided a movable block $n$, which can slide with gentle friction, and parallel to itself, along the tines $g\ g$. This forward and backward motion is produced by working the screw $f$, the threaded part of which passes through the fixed block $m$, as through a nut. It is obvious that the speed vibration of the system will be determined by the position of the movable block $n$ on the tines $g\ g$, and that this speed can be increased or diminished according as said movable block $n$ is nearer to or farther away from the free extremities of the tines $g\ g$. This variation in the speed of vibration can be produced while the system is working, and without stopping the vibratory action of the tines, so as to bring them gradually from one speed to the other. The construction of this arrangement is clearly indicated on the drawings, in which Fig. 5 represents an elevation, Fig. 6 a plane, and Fig. 7 a section along the line X Y of Fig. 6, showing the detail of the sliding block. However, it is evident that the constructive details indicated on the drawings can be modified in various ways without altering in any fashion the principle of the system, which consists, essentially, in an arrangement for varying the lengths of the vibrating tines of a tuning-fork while working. For instance, instead of the regulating-screw $f$, I could make use of toothed wheels working the sliding block $n$ by means of a rack and pinion or any other mechanical device for the purpose. It is also understood that all the electric connections hereinbefore fully described and illustrated for the establishment and maintenance of synchronism can be applied without any modification to such a vibrating system.

I claim—

1. The combination, in a system of synchronous telegraphy in which a single line-wire is used, of two vibrating tuning-forks $B'$ $B^2$, governing an electromotor, a current-distributer, a trailing finger on said distributer and connected with the line-wire, and electrical pitch-varying means at the receiving-station and controlled from the transmitting-station, substantially as described, whereby the vibrations of the said forks may be made equal or unequal at will, substantially as set forth.

2. The combination, in a system of synchronous telegraphy in which a single line-wire is used, of the tuning-fork B, local battery $a$, motor-battery $e$, line-battery H, current-distributer D, provided with contact-segments $x$ and $y$, respectively connected to the positive and negative poles of said line-battery, and trailer F, all arranged to operate as described and placed at the transmitting end of said line-wire, with the tuning-fork $B'$, having magnetized tines, local batteries $a'$ $a''$, of equal strength but of opposite polarities, and polarized relay R, trailer $F'$, and current-distributer D, having contact-segment $z$ connected to said relay R, all arranged to operate substantially as described and placed at the receiving end of said line-wire, substantially as described.

3. The combination, in an electro-tuning-fork, of the parallel tines $g$ $g$, both fixed at one extremity by the block $m$, with the single sliding block $n$ embracing both said tines, and with the longitudinal screw $f$ threaded into said block $m$ and swiveled in said block $n$, substantially as described.

In witness whereof I have hereunto set my hand in presence of two witnesses.

GILBERT ALFRED CASSAGNES.

Witnesses:
GEORGE LAURENT, Jr.,
ALEXANDRE HUBAUT.